(12) United States Patent
Watson et al.

(10) Patent No.: US 7,467,639 B2
(45) Date of Patent: Dec. 23, 2008

(54) SYSTEMS AND METHODS FOR CONTROLLING GAS FLOW

(75) Inventors: Eric Kent Watson, Crestwood, KY (US); Derrick Douglas Little, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/402,513

(22) Filed: Mar. 28, 2003

(65) Prior Publication Data
US 2004/0191711 A1     Sep. 30, 2004

(51) Int. Cl.
F23N 1/00     (2006.01)
(52) U.S. Cl. .................. 137/1; 137/487.5; 431/12; 700/41; 700/42; 700/282
(58) Field of Classification Search .............. 137/1, 137/487.5; 126/39 BA, 39 E; 251/129.08; 431/12, 89; 361/152; 700/28, 40–43, 274, 700/282, 78
See application file for complete search history.

(56) References Cited

U.S. PATENT DOCUMENTS

| 3,757,808 | A | * | 9/1973 | Peterson et al. ............... 137/2 |
| 3,874,407 | A | * | 4/1975 | Griswold ............... 137/596.17 |
| 4,344,128 | A | * | 8/1982 | Frye ............................ 700/78 |
| 4,345,737 | A | * | 8/1982 | Kawai et al. ............ 251/129.05 |
| 4,391,265 | A | | 7/1983 | Chen |
| 4,813,443 | A | * | 3/1989 | Pounder ........................ 137/1 |
| 4,921,210 | A | | 5/1990 | Hutchinson et al. |
| 4,930,488 | A | | 6/1990 | Pearman et al. |
| 4,940,076 | A | * | 7/1990 | Desautels et al. ........... 164/452 |
| 4,993,401 | A | | 2/1991 | Diekmann et al. |
| 4,997,161 | A | | 3/1991 | Hutchison et al. |
| 5,146,941 | A | * | 9/1992 | Statler ..................... 137/487.5 |
| 5,241,463 | A | | 8/1993 | Lee |
| 5,458,294 | A | | 10/1995 | Zachary et al. |
| 5,575,638 | A | | 11/1996 | Witham et al. |
| 5,673,680 | A | * | 10/1997 | Kalmer et al. ............ 126/39 B |
| 5,813,320 | A | | 9/1998 | Frasnetti et al. |
| 6,287,108 | B1 | | 9/2001 | Rothenberger et al. |

FOREIGN PATENT DOCUMENTS

EP     0 640 800 A1 *  3/1995

OTHER PUBLICATIONS

Article on PID Control from Wiley Encyclopedia of Electrical and Electronics Engineering Online; Dec. 27, 1999.*

* cited by examiner

Primary Examiner—Kevin L Lee
(74) Attorney, Agent, or Firm—George L. Rideout, Esq.; Armstrong Teasdale LLP

(57) ABSTRACT

A method for controlling a motion of a gas valve in a gas feed line coupling a supply device to a burner is provided. The method includes receiving a signal representative of a user-selected desired level of heat output of the burner, translating the received signal to a first current signal, measuring a second current signal in a conducting medium that is operatively coupled with the valve, deriving a third current signal from the first and second current signals, and providing the third current signal to the conducting medium to control the motion of the valve.

13 Claims, 5 Drawing Sheets

SYSTEMS AND METHODS FOR CONTROLLING GAS FLOW

BACKGROUND OF THE INVENTION

This invention relates generally to gas appliances and more particularly, to systems and methods for controlling gas flow in gas appliances. Examples of gas appliances include gas-operated cooking appliances, gas-operated baking appliances, gas-operated stoves, gas-operated cookers, gas-operated hobs, and gas-operated ovens. Natural gas, liquid gases and gasified liquids are various types of gases that are used in the gas appliances. Examples of liquid gases include butane and propane and examples of gasified liquids include benzene and spirit. The gases differ in their combustion behavior and their calorific value.

Gas is extracted from a supply device, for example, a gas supply network, a gas cylinder, and a gas tank or reservoir, and fed to a burner of a gas appliance via a gas valve in a gas feed line. An input that changes the position of the valve is effected by a selector operated by a user, for example, by turning an adjustment knob or by selection on a control panel. The selection actuates, for example, opens or closes, the valve located in the gas feed line to set a heat output that is intended by the user. By partial opening or closing of the valve, the gas flow through the gas feed line is changed and thus the heat output that is intended by the user is set. The burner has a burner nozzle, which during operation of the burner constitutes a flow resistance limiting gas flowing from the burner nozzle. The burner nozzle thus determines a maximum gas flow that corresponds to a maximum heat output or heating power of the burner. Types of burners vary with a change in size and shape of the burner nozzle.

Pressure of the gas may vary relative to the atmospheric pressure depending on a gas system used, for example, on the type of the supply device and the type of gas used. Moreover, a valve may exhibit hysteresis in the setting behavior. An example of hysteresis is when the gas flow at the same valve position varies as a function of the length of travel of the valve during the just prior actuation and the direction in which the valve is actuated for setting the intended gas flow.

Because of the gas-pressure fluctuations, and the hysteresis of the valve, the reproducibility and setting accuracy of the gas flow to the valve is inconsistent for any particular setting. No accurately defined heat outputs can be selected by means of the selector. For this reason, the user generally changes the position of the valve until the intended heat output is reached, in the course of which the user is in essence guided by flame size, cooking behavior, or baking behavior of the food.

BRIEF SUMMARY OF THE INVENTION

A method for controlling a motion of a gas valve in a gas feed line coupling a supply device to a burner is provided. The method includes receiving a signal representative of a user-selected desired level of heat output of the burner, translating the received signal to a first current signal, measuring a second current signal in a conducting medium that is operatively coupled with the valve, deriving a third current signal from the first and second current signals, and providing the third current signal to the conducting medium to control the motion of the valve.

In another aspect, a controller programmed to receive a signal representative of a user-selected desired level of heat output of a burner is provided. The controller translates the received signal to a first current signal, measures a second current signal in a conducting medium that is operatively coupled with a gas valve, obtains a third current signal from the first and second current signals, and provides the third current signal to the conducting medium to control a motion of the valve to further control the heat output of the burner.

In yet another aspect, a gas appliance that includes a selector for selecting a desired level of heat output of a burner that is fed gas via a gas feed line is provided. The appliance includes a gas valve in the gas feed line and a controller configured to receive a signal representative of the desired level of heat output of the burner, translate the received signal to a first current signal, measure a second current signal in a conducting medium that is operatively coupled with the valve, obtain a third current signal from the first and second current signals, and provide the third current signal to the conducting medium to control a motion of the valve to further control the heat output of the burner.

DETAILED DESCRIPTION OF THE INVENTION

Figure 1:
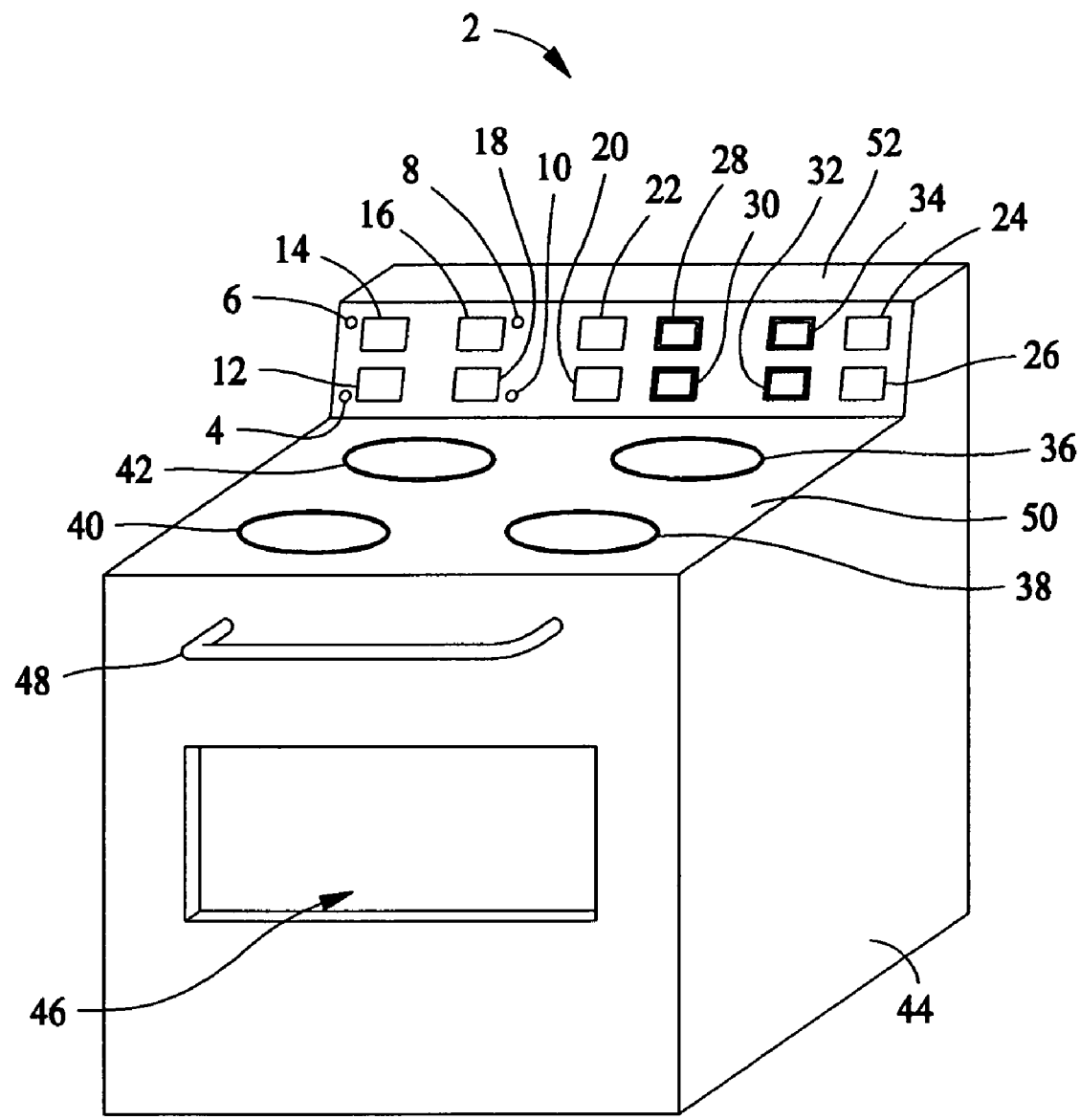
FIG. 1 is an embodiment of a gas appliance in which a system and method for controlling gas flow is implemented.

FIG. 1 is an embodiment of a gas appliance 2 in which the herein described system and method for controlling gas flow is implemented. Examples of gas appliances include, but are not limited to, gas-operated cooking appliances, gas-operated baking appliances, gas-operated stoves, gas-operated cookers, gas-operated hobs, and gas-operated ovens. Appliance 2 has an outer body 44 that incorporates a cooktop 50 that forms an upper portion of appliance 2. Appliance 2 has gas burners 36, 38, 40, and 42 for burning gas for various purposes, such as cooking, boiling, and melting. An oven 46 is positioned below cooktop 44 and has a front-opening access door that can be accessed using a handle 48. A range backsplash 52 extends upward of a rear edge of cooktop and includes control displays 6, 8, 10, 12, 20, 22, 24, 26, on/off switches 12, 14, 16, 18, and control selectors 28, 30, 32, 34 for user manipulation to select operative features such as heat output from burners 36, 38, 40, and 42. Light emitting diodes (LEDs) are an example of control displays 6, 8, 10, and 12. Digital displays are an example of control displays 20, 22, 24, and 26.

When a user desires to operate one of burners 36, 38, 40, and 42, the user pushes a corresponding on/off switch. For example, when the user intends to operate burner 42, the user pushes on/off switch 14. The user then can adjust a level of heat output, which is measured in BTU per hour, from burners 36, 38, 40, and 42 by pushing selectors 28, 30, 32, and 34. For example, the user can increase the level of heat output from burner 42 by pushing a top arrow of selector 28 and the user can decrease the level of heat output from burner 42 by pushing a bottom arrow of selector 28. In another embodiment, the user turns a rotatory dial to a desired setting for a selected burner and the burner is turned on without pushing an on/off switch. Displays 4, 6, 10, and 18 indicate which burners are operational. To illustrate, when the user operates burner 42 by pushing on/off switch 14, display 6 indicates that burner 42 is operational. Displays 20, 22, 24, and 26 indicate levels of heat output that are desired by the user, referred to herein as desired levels of heat output. Each display 20, 22, 24, and 26 indicates at least two desired levels of heat output of corresponding burners 20, 22, 24, and 26. For example, display 22 shows 4 desired levels, 1 thru 4, of heat output of burner 42. As another example, display 22 shows 9 desired levels, 1 thru 9, of heat output of burner 42. As yet another example, display 22 shows 10 desired levels, 1 thru 10 of heat output of burner 42.

Figure 2:
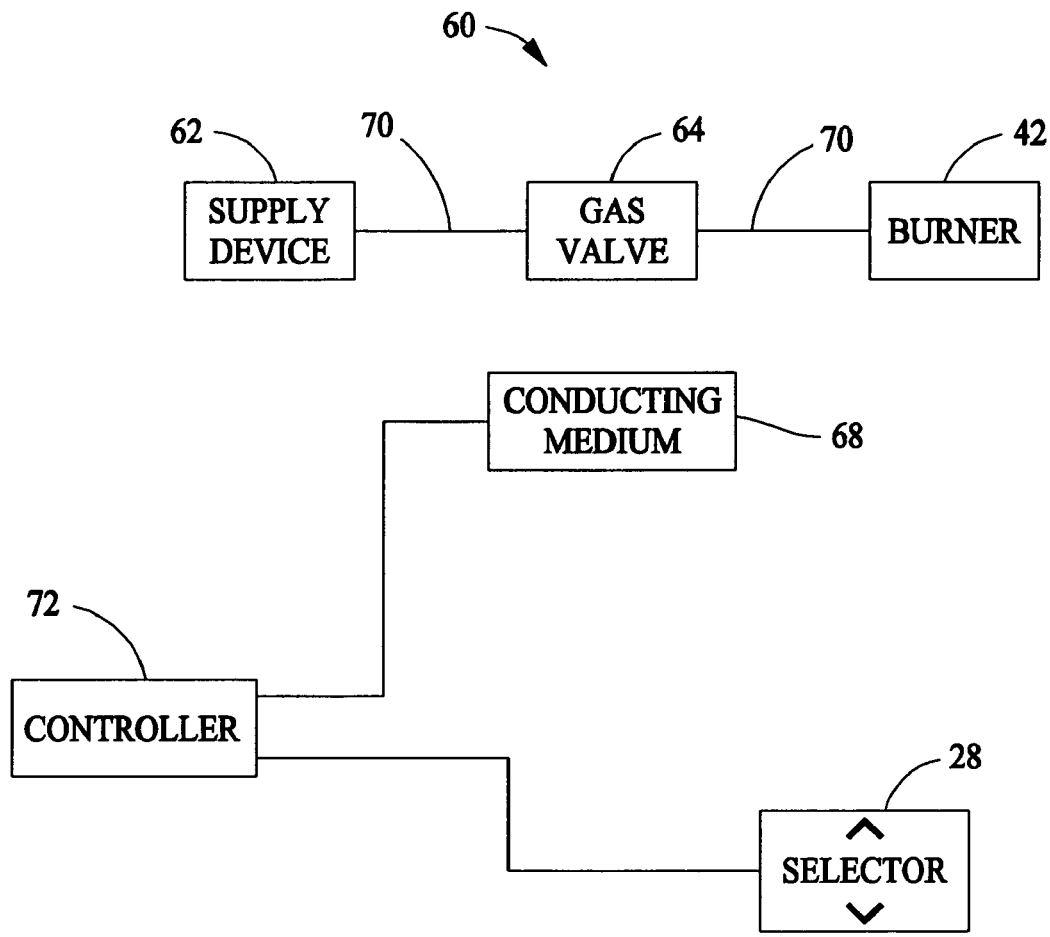
FIG. 2 is an embodiment of the system for controlling gas flow.

FIG. 2 is an embodiment of a system 60 for controlling gas flow. System 60 includes a controller 72, one of selectors 28, 30, 32, and 34, for example, selector 28, a conducting medium 68, a supply device 62, a gas valve 64 in a gas feed line 70, and burner 42 that corresponds to selector 28. Examples of controllers include computers, microprocessors, microcontrollers, reduced instruction set circuits (RISC), application specific integrated circuits (ASICs), logic circuits, and all other programmable circuits. An illustration of valve 64 is a modulating valve whose positions are not limited to being on/off but does include the on/off positions. Examples of conducting mediums include coils and wires. Controller 72, valve 64, and conducting medium 68 are located inside appliance 2. In an alternative embodiment, controller 72 is located outside appliance 2. Controller 72 is coupled to selector 28 and conducting medium 68. Conducting medium 68 is operatively coupled with valve 64 via an electromagnetic field. For example, a current signal through conducting medium 68 produces an electromagnetic field that interacts with a ferromagnetic material, such as steel, of valve 64. The interaction determines the motion, for example, direction and speed, of valve 64. Supply device 62 is coupled to burner 42 via valve 64. Examples of supply devices include a gas supply network, a gas cylinder, a gas tank, and a gas reservoir.

Supply device 62 provides a supply of gas to burner 42 via valve 64. The user pushes at top arrow or at bottom arrow of selector 28 to increase or decrease respectively the heat output of burner 42. When the user pushes at the top arrow of selector 28, controller 72 provides a current signal to conducting medium 68 so that valve 64 increases an amount of gas fed from supply device 62 to burner 42. Alternatively, when the user pushes at the bottom arrow of selector 28, controller 72 provides a current signal to conducting medium 68 so that valve 64 decreases an amount of gas fed from supply device 62 to burner 42. Thus, the selection by the user actuates, for example, opens or closes, valve 64 to set the desired level of heat output of burner 42.

Figure 3:
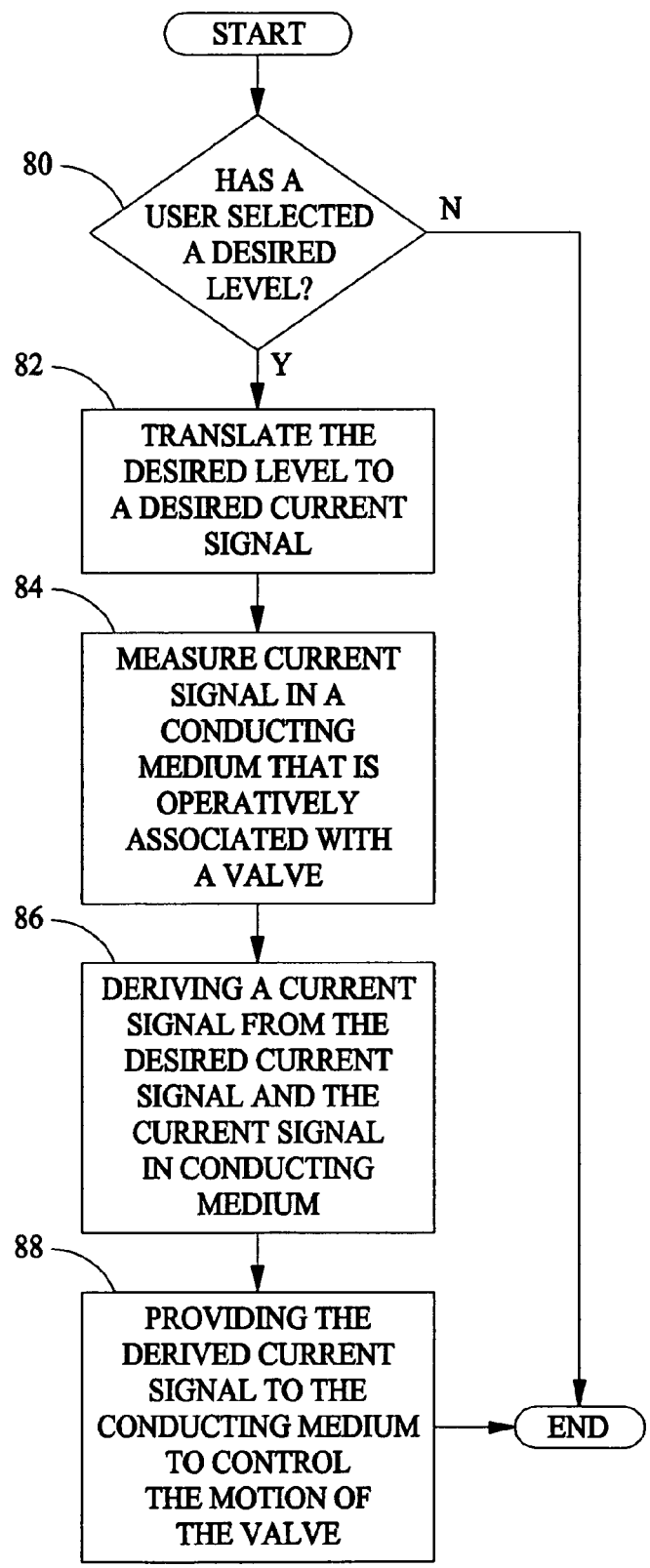
FIG. 3 is a flowchart of an embodiment of the method for controlling gas flow.

FIG. 3 is a flowchart of an embodiment of a method for controlling gas flow that is executed by controller 72. The method can be stored in a memory, such as, for example, a random access memory (RAM) (not shown) that is coupled to controller 72. Other types of memories that can store the methods for controlling gas flow include a flash memory (FLASH), a programmable read only memory (PROM), and an electronically erasable programmable read only memory (EEPROM). The method starts by determining 80 whether the user has selected a desired level of heat output of burner 42. The user selects the desired level by pushing at top or bottom arrow of selector 28. When the user has not selected a desired level, the method ends. Alternatively, when the user has selected a desired level, the method includes translating 82 the desired level to a desired current signal. The desired current signal is a current signal that corresponds to the desired level. In one embodiment, desired levels and corresponding desired current signals are stored in a table in the RAM. The method further includes measuring 84 a current signal flowing in conducting medium 68 that is operatively coupled with valve 64. The current signal in conducting medium 68 is actual current signal that is flowing in conducting medium 68 when the user selects the desired level of heat output by pushing selector 28.

The method also includes deriving 86 a current signal from the desired current signal and the current signal in conducting medium 68. The derivation varies based on whether the current signal in conducting medium 68 is greater than a sum of the desired current signal and a tolerance band, whether the current signal in conducting medium 68 is less than a difference between the desired current signal and the tolerance band, or whether the current signal in conducting medium 68 is within the tolerance band. The tolerance band is a range around the desired current signal to account for a variance in the desired current signal. Ranges of the tolerance band include, for example, ±2%, ±5%, and ±10% of the desired current signal. When the current signal in conducting medium 68 is greater than a sum of the desired current signal and the tolerance band, the method includes multiplying a slope factor to a difference between the current signal in conducting medium 68 and the desired current signal and subtracting the result of the multiplication from the desired current signal to produce the derived current signal. To explain the preceding sentence in a representative form:

If [current signal in conducting medium 68 > (desired current signal + tolerance band)], then {
    result = (current signal in conducting medium 68 − desired current signal)*slope factor
    derived current signal = desired current signal − result
}

The slope factor is any real number or integer, such as 1, 2, 3, 4, . . . , which is used to alter response time taken to correct current signal in conducting medium 68. The larger the slope factor, the quicker system 60 responds to "out of tolerance" conditions. "Out of tolerance" conditions occur when current signal in conducting medium 68 is less than a difference between the desired current signal and the tolerance band or is greater than a sum of the desired current signal and the tolerance band. However, the larger the slope factor, the more likely system 60 will become unstable and oscillate or ring. The slope factor may be different for discrete levels of "out of tolerance" conditions to allow for quicker response of system 60.

When the current signal in conducting medium 68 is less than a difference between the desired current signal and the tolerance band, the method includes multiplying the slope factor to a difference between the desired current signal and the current signal in conducting medium 68 and adding the result of the multiplication to the desired current signal to produce the derived current signal. To explain the preceding sentence in a representative form:

If [current signal in conducting medium 68 < (desired current signal − tolerance band)], then {
    result = (desired current signal − current signal in conducting medium 68)*slope factor
    derived current signal = desired current signal + result
}

When the current signal in conducting medium 68 is within the tolerance band, the method sets the derived current signal equal to the desired current signal. The method further includes providing 88 the derived current signal to conducting medium 68 to control the motion of valve 64 to further control heat output of burner 42.

An alternative embodiment of the method illustrated in FIG. 3 uses pulse width modulation signals instead of current signals. For example, the method includes translating the desired current signal to a desired pulse width modulation signal after translating 82 the desired level of heat output of burner 42 to the desired current signal. The method also includes translating the current signal in conducting medium 68 to a pulse width modulation signal after measuring 84 the current signal in conducting medium 68. The method also includes deriving a pulse width modulation signal from the desired pulse width modulation signal and the pulse width modulation signal of conducting medium 68. The derivation occurs in the same manner as described above by using current signals except that pulse width modulation signals are used instead of current signals. The method also includes providing the derived pulse width modulation signal to conducting medium 68.

Figure 4:
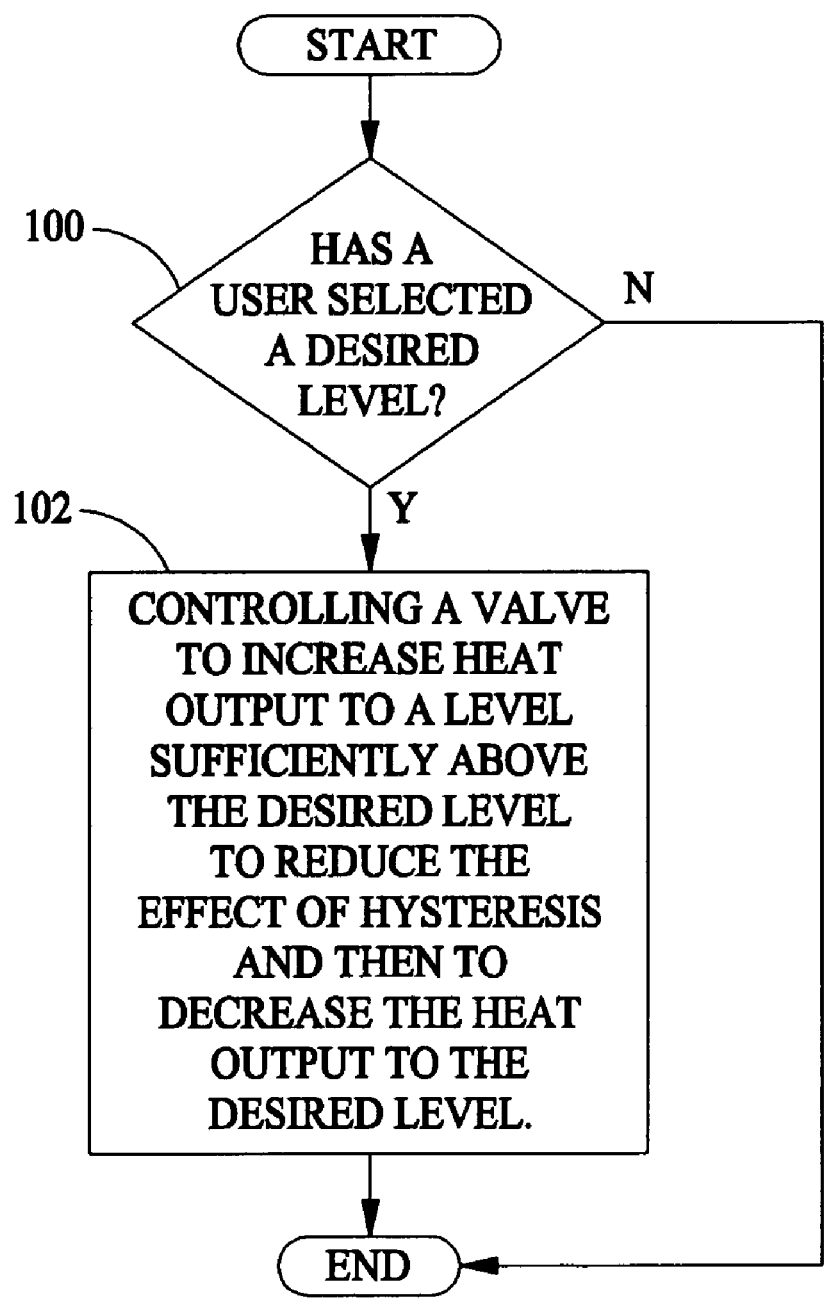
FIG. 4 is a flowchart of another embodiment of the method for controlling gas flow.

FIG. 4 is a flowchart of another embodiment of a method for controlling gas flow. The method includes determining 100 whether a user has selected a desired level of heat output of burner 42 that is fed gas via gas feed line 70. When the user has not selected the desired level, the method ends. Alternatively, when the user has selected the desired level, the method includes controlling 102 valve 64 to increase the heat output of burner 42 to a level sufficiently above the desired level to reduce the effect of hysteresis of burner 42 and then to decrease the heat output to the desired level. For example, if appliance 2 has 4 levels of heat output of burner 42 that the user can select from and the user selects level 1, the method controls valve 64 to increase the heat output to level 2 to reduce the effect of hysteresis and then controls valve 64 to decrease the heat output to level 1. As another example, if appliance 2 has 4 levels of heat output of burner 42 that the user can select from and the user selects level 1, the method controls valve 64 to increase the heat output to level 3 to reduce the effect of hysteresis and then controls valve 64 to decrease the heat output to level 1. As yet another example, if appliance 2 has 4 levels of heat output of burner 42 that the user can select and the user selects level 1, the method controls valve 64 to increase the heat output to level 4 to reduce the effect of hysteresis and then controls valve 64 to decrease the heat output to level 1. The method controls valve 64 by determining an amount of the desired current signal corresponding to a desired level of heat output of burner 42, providing an amount of a current signal to conducting medium 68 that is operatively coupled with valve 64, and reducing the amount of the current signal provided to burner 42 to equal the amount of the desired current signal. The amount of the current signal provided to conducting medium 68 is sufficiently greater than the amount of the desired current signal to reduce the effect of hysteresis of valve 64.

Figure 5:
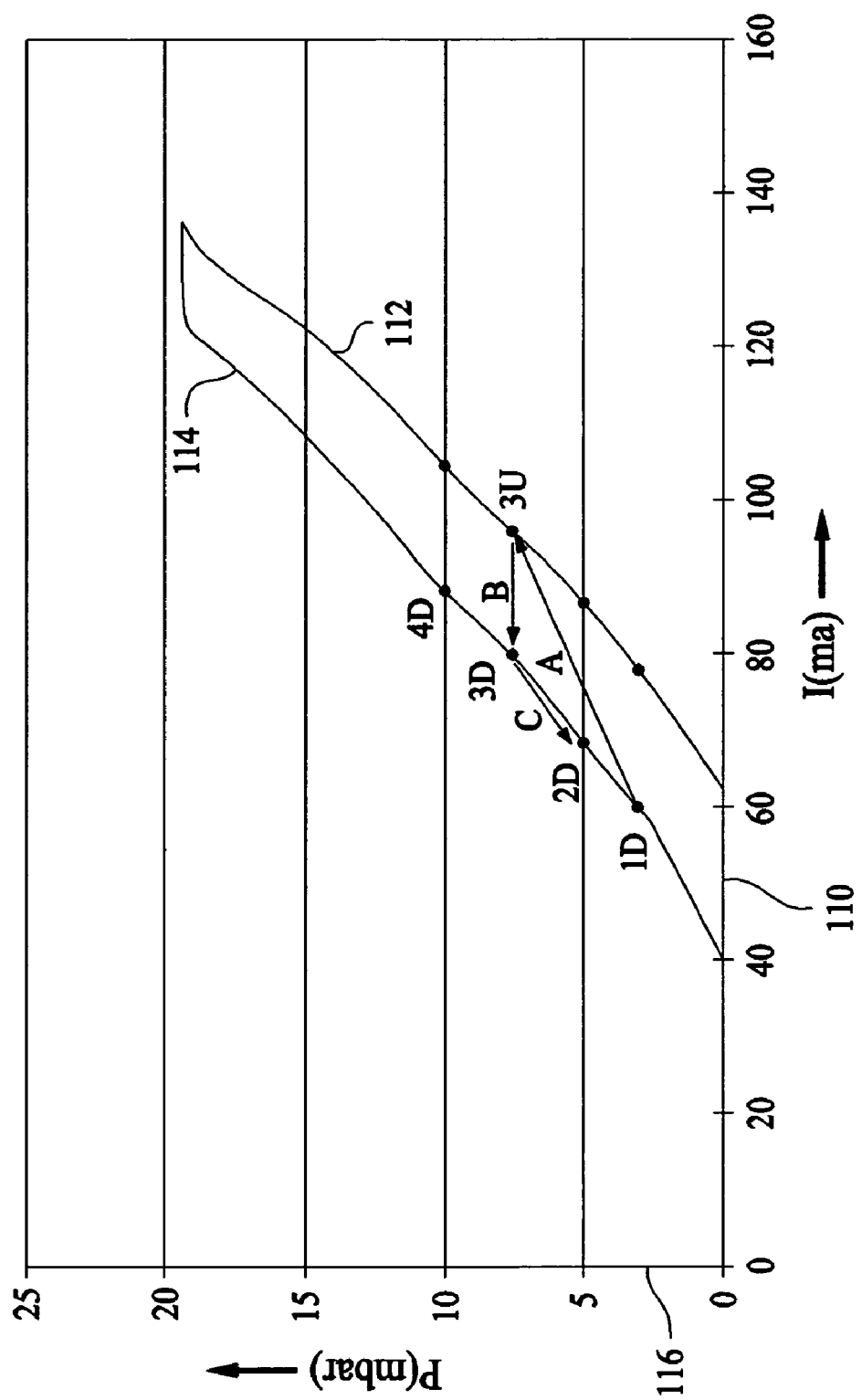
FIG. 5 is a graph illustrating the method of FIG. 4.

FIG. 5 is a graph illustrating the method of FIG. 4. Plotted along an ordinate 116 is the pressure of a gas in gas feed line 70 and plotted along an abscissa 110 is a current signal in conducting medium 68. The graph was obtained by measuring the pressure in millibars (mbar) and the current signal in milliamperes (mA). The current signal is initially increased to a level sufficiently about the desired level that is selected by the user to remove the effect of hysteresis of valve 64. The current signal is then decreased along a downward curve 114 of the graph to the desired level. For example, if the appliance has 4 levels from 1D to 4D and the user selects level 2D, the amount of current signal in conducting medium 68 is increased from about 60 mA, which corresponds to level 1D at which the appliance is initial operating, to about 95 mA, which corresponds to a point 3U on an upward curve 112, and decreased along the downward curve 114, to the level 2D via level 3D. Increasing the amount of current signal in conducting medium 68 above the desired level and then decreasing the amount to the desired level reduces the effect of hysteresis of valve 64.

Thus, the systems and methods are used to control gas flow when the user is operating a gas appliance. The systems and methods reduce the effects of gas-pressure fluctuations and the effect of hysteresis, thereby making it easier for the user to obtain desired results.

While the invention has been described in terms of various specific embodiments, those skilled in the art will recognize that the invention can be practiced with modification within the spirit and scope of the claims.

What is claimed is:

1. A method for controlling a motion of a gas valve in a gas feed line coupling a supply device to a burner, the method comprising:

providing a controller;

operatively coupling a selector to the controller;

operatively coupling a conducting medium between the controller and the gas valve, wherein the conducting medium has an operating current;

receiving a signal at the controller from the selector representative of a user-selected desired level of heat output of the burner;

translating the received signal to a first current signal;

measuring a second current signal in the conducting medium, wherein the second current signal is based on the operating current of the conducting medium;

receiving the second current signal at the controller;

determining a third current signal using a plurality of selectable formulas, wherein a selection of a formula from the plurality of selectable formulas is based on a comparison of the second current signal and at least one of the first current signal and a tolerance band defined around the first current signal, said determining a third current signal comprising:

multiplying a slope factor by a difference between the second current signal and the first current signal;

using a first selectable formula of the plurality of selectable formulas to determine the third current signal by subtracting a result of the multiplication from the first current signal if the second current signal is greater than the sum of the first current signal and the tolerance band;

using a second selectable formula of the plurality of selectable formulas to determine the third current signal by adding a result of the multiplication to the first current signal if the second current signal is less than the difference between the first current signal and the tolerance band; and using a third selectable formula of the plurality of selectable formulas to determine the third current signal by setting the third current signal equal to the first current signal if the second current signal is within the tolerance band; and providing the third current signal to the conducting medium to change the operating current of the conducting medium to control the motion of the gas valve to change a heat output of the burner.

2. A method in accordance with claim 1 comprising:

controlling the valve to increase the heat output to a level sufficiently above the desired level to reduce an effect of hysteresis and then to decrease the heat output to the desired level.

3. A method in accordance with claim 2 wherein the controlling comprises:
   determining a first amount of the first current signal corresponding to the desired level;
   providing a second amount of a fourth current signal to the conducting medium, the second amount being greater than the first amount; and
   reducing the second amount to equal the first amount.

4. A method in accordance with claim 2 wherein the receiving comprises receiving the signal representative of the desired level of heat output of the burner from four levels of heat output of the burner, and the controlling includes controlling the valve to increase the heat output to one level above the desired level to reduce the effect of hysteresis and then to decrease the heat output to the desired level.

5. A method in accordance with claim 2 wherein the receiving comprises receiving the signal representative of the desired level of heat output of the burner from four levels of heat output of the burner, and the controlling includes controlling the valve to increase the heat output to two levels above the desired level to reduce the effect of hysteresis and then to decrease the heat output to the desired level.

6. A method in accordance with claim 2 wherein the receiving comprises receiving the signal representative of the desired level of heat output of the burner from four levels of heat output of the burner, and the controlling includes controlling the valve to increase the heat output to three levels above the desired level to reduce the effect of hysteresis and then to decrease the heat output to the desired level.

7. A controller programmed to:
   receive a signal representative of a user-selected desired level of heat output of a burner;
   translate the received signal to a first current signal;
   measure a second current signal relating to an operating current of a conducting medium that is operatively coupled with a gas valve;
   determine a third current signal using a plurality of selectable formulas, wherein a selection of a formula from the plurality of selectable formulas is based on a comparison of the second current signal and at least one of the first current signal and a tolerance band defined around the first current signal, said determining a third current signal comprising:
      multiplying a slope factor by a difference between the second current signal and the first current signal;
      using a first selectable formula of the plurality of selectable formulas to determine the third current signal by subtracting a result of the multiplication from the first current signal if the second current signal is greater than the sum of the first current signal and the tolerance band;
      using a second selectable formula of the plurality of selectable formulas to determine the third current signal by adding a result of the multiplication to the first current signal if the second current signal is less than the difference between the first current signal and the tolerance band; and
      using a third selectable formula of the plurality of selectable formulas to determine the third current signal by setting the third current signal equal to the first current signal if the second current signal is within the tolerance band; and
   provide the third current signal to the conducting medium to change the operating current of the conducting medium to control a motion of the gas valve to further control a heat output of the burner.

8. A controller in accordance with claim 7, the controller programmed to:
   control a motion of the valve to increase the heat output to a level sufficiently above the desired level to reduce an effect of hysteresis of the valve and then to decrease the heat output to the desired level.

9. A controller in accordance with claim 8 wherein to control the motion of the valve, the controller programmed to:
   determine a first amount of the first current signal corresponding to the desired level;
   provide a second amount of a fourth current signal to a conducting medium that is operatively coupled with the valve, the second amount being greater than the first amount; and
   reduce the second amount to equal the first amount.

10. A controller in accordance with claim 8 wherein to receive the signal representative of the desired level, the controller programmed to receive the signal representative of the desired level of heat output of the burner from four levels of heat output of the burner, and to control the motion of the valve, the controller programmed to control the motion of the valve to increase the heat output to one level above the desired level to reduce an effect of hysteresis and then to decrease the heat output to the desired level.

11. A controller in accordance with claim 8 wherein to receive the signal representative of the desired level, the controller programmed to receive the signal representative of the desired level of heat output of the burner from four levels of heat output of the burner, and to control the motion of the valve, the controller programmed to control the motion of the valve to increase the heat output to two levels above the desired level to reduce an effect of hysteresis and then to decrease the heat output to the desired level.

12. A controller in accordance with claim 8 wherein to receive the signal representative of the desired level, the controller programmed to receive the signal representative of the desired level of heat output of the burner from four levels of heat output of the burner that is fed via the gas feed line, and to control the motion of the valve, the controller programmed to control the motion of the valve to increase the heat output to three levels above the desired level to reduce an effect of hysteresis and then to decrease the heat output to the desired level.

13. A gas appliance comprising:
   a selector for selecting a desired level of heat output of a burner that is fed gas via a gas feed line;
   a gas valve in the gas feed line;
   a conducting medium operatively coupled to said gas valve and having an operating current for controlling a position of said gas valve; and
   a controller configured to:
      receive a signal from said selector representative of the desired level of heat output of the burner;
      translate the received signal to a first current signal;
      measure a second current signal relating to the operating current of the conducting medium;
      determine a third current signal using a plurality of selectable formulas, wherein a selection of a formula from the plurality of selectable formulas is based on a comparison of the second current signal and at least one of the first current signal and a tolerance band defined around the first current signal, said determining a third current signal comprising:
         multiplying a slope factor by a difference between the second current signal and the first current signal;
         using a first selectable formula of the plurality of selectable formulas to determine the third current signal by subtracting a result of the multiplication from the first current signal if the second current signal is greater than the sum of the first current signal and the tolerance band;

using a second selectable formula of the plurality of selectable formulas to determine the third current signal by adding a result of the multiplication to the first current signal if the second current signal is less than the difference between the first current signal and the tolerance band; and using a third selectable formula of the plurality of selectable formulas to determine the third current signal by setting the third current signal equal to the first current signal if the second current signal is within the tolerance band; and provide the third current signal to the conducting medium to change the operating current of said conducting medium to control a motion of said gas valve to further control a heat output of the burner.

* * * * *